(12) United States Patent
Spiegel

(10) Patent No.: US 6,957,363 B2
(45) Date of Patent: Oct. 18, 2005

(54) METHOD AND APPARATUS FOR CONTROLLING THE TERMINATION OF PROCESSES IN RESPONSE TO A SHUTDOWN COMMAND

(75) Inventor: Michael G. Spiegel, Monroe, NY (US)

(73) Assignee: International Business Machines Corporation, Armonk, NY (US)

( * ) Notice: Subject to any disclaimer, the term of this patent is extended or adjusted under 35 U.S.C. 154(b) by 638 days.

(21) Appl. No.: 10/108,053

(22) Filed: Mar. 27, 2002

(65) Prior Publication Data

US 2003/0188217 A1 Oct. 2, 2003

(51) Int. Cl.$^7$ ................................................ G06F 11/00
(52) U.S. Cl. ........................... 714/24; 713/324; 713/330
(58) Field of Search ........................... 714/24; 713/324, 713/330

(56) References Cited

U.S. PATENT DOCUMENTS

| | | | |
|---|---|---|---|
| 5,317,752 A | 5/1994 | Jewett et al. ................ | 395/750 |
| 5,594,893 A | 1/1997 | Byers et al. ................. | 395/557 |
| 5,751,950 A | 5/1998 | Crisan ................... | 395/188.01 |
| 5,757,895 A | 5/1998 | Aridas et al. ................ | 379/136 |
| 5,781,770 A | 7/1998 | Byers et al. ................. | 395/557 |
| 5,794,031 A | 8/1998 | Nakadai ...................... | 395/652 |
| 5,884,022 A | 3/1999 | Callsen et al. ......... | 395/182.22 |
| 6,088,807 A * | 7/2000 | Maher et al. ................ | 713/324 |
| 6,115,824 A * | 9/2000 | Ha .............................. | 713/330 |
| 6,223,234 B1 | 4/2001 | Mahalingam ............... | 710/103 |
| 6,230,181 B1 | 5/2001 | Mitchell et al. ............ | 709/100 |
| 6,587,951 B1 * | 7/2003 | Flanigan ..................... | 713/310 |

OTHER PUBLICATIONS

Book –Modern Operating Systems by A.S. Tanenbaum, 1992, pp. 13–14, 283–28;.
Book –The Unix Operating System by Kaare Christian, 1988, pp. 94–95;.
Manual –MVS System Commands, Mar. 2001, SA22–7627–00 pp. 4–95 to 4–98, 4–167 to 4–178, 4–277 to 4–308.
Manual–UNIX System Services Planning, Mar. 2001, GA22–7800–00. pp. 283–288.
Manual –UNIX System Services Planning, Mar. 2001, GA22–7800–00, pp. 283–288.
Manual –UNIX SystemServices Programming: Assembler Callable Sevices Reference, Mar. 2001, SA22–7803–00, pp. 409–418, 657–660, 1111–1112, 1239–1240.

* cited by examiner

Primary Examiner—Scott Baderman
Assistant Examiner—Joshua Lohn
(74) Attorney, Agent, or Firm—William A. Kinnaman, Jr.

(57) ABSTRACT

A method and apparatus for controlling the termination of one or more processes in an information handling system, such as UNIX processes running under the control of an UNIX operating system kernel, in response to a shutdown command. Processes may optionally register with a registration facility of the operating system kernel as permanent processes ineligible for process termination or as blocking processes entitled to advance notification of process termination. In response to receiving a shutdown command, a shutdown facility of the operating system kernel notifies each process that has registered as a blocking process of an impending shutdown. Upon the expiration of a predetermined time interval, the shutdown facility determines whether all of the processes that have registered as blocking processes have concurred in the shutdown, either by unregistering as blocking processes or by terminating. If all of the processes that have registered as blocking processes have concurred in the shutdown, the shutdown facility terminates processes that have not registered as permanent processes while allowing processes that have registered as permanent processes to continue to run. Otherwise, the shutdown facility aborts the shutdown without terminating any of the processes and generates a message identifying processes that have not concurred in the shutdown.

30 Claims, 3 Drawing Sheets

METHOD AND APPARATUS FOR CONTROLLING THE TERMINATION OF PROCESSES IN RESPONSE TO A SHUTDOWN COMMAND

BACKGROUND OF THE INVENTION

1. Field of the Invention

This invention relates to a method and apparatus for controlling the termination of one or more processes in an information handling system in response to a shutdown command and, in particular, to a method and apparatus for controlling the termination of UNIX processes running under the control of an UNIX operating system kernel.

2. Description of the Related Art

A typical computer system, especially a server system, has a multiplicity of different processes running concurrently under the control of an operating system kernel, often a UNIX kernel. Frequently, for maintenance or other purposes, it is necessary to shut down most or all of these processes. Typically, in a UNIX system, this is done by sending each process a SIGTERM signal, followed by a SIGKILL signal if the process fails to respond to the SIGTERM signal. While this successfully terminates the processes, it does so in an unpredictable manner, since the processes being terminated must do so abruptly, potentially without executing their usual termination procedures.

SUMMARY OF THE INVENTION

In general, the present invention contemplates a method and apparatus for controlling the termination of one or more processes in an information handling system in response to a shutdown command. Processes may register with a registration facility of the operating system kernel as blocking processes entitled to advance notification of process termination. In response to receiving a shutdown command, a shutdown facility of the operating system kernel notifies each process that has registered as a blocking process of an impending shutdown. Upon the expiration of a predetermined time interval, the shutdown facility determines whether all of the processes that have registered as blocking processes have concurred in the shutdown, either by unregistering as blocking processes or by terminating. If all of the processes that have registered as blocking processes have concurred in the shutdown, the shutdown facility terminates all of the processes. Otherwise, the shutdown facility aborts the shutdown without terminating any of the processes and generates a message identifying processes that have not concurred in the shutdown.

In a preferred embodiment, the processes are UNIX processes running under the control of an UNIX operating system kernel, such as the UNIX System Services component of the IBM z/OS operating system. In such an embodiment, the shutdown facility may notify blocking processes of an impending shutdown by driving either a SIGDANGER signal or an application exit, and may terminate processes by issuing a SIGTERM signal, followed by a SIGKILL signal if the process fails to respond to the SIGTERM signal.

Also in a preferred embodiment, processes may register either as blocking processes or as permanent processes ineligible for process termination. In such an embodiment, if all of the processes that have registered as blocking processes have concurred in the shutdown, the shutdown facility terminates processes that have not registered as permanent processes while allowing processes that have registered as permanent processes to continue to run.

The present invention thus allows a process to temporarily block a system shutdown. This allows applications, especially server applications, that use an operating system kernel for their primary functionality to clean up in a manner consistent with their shutdown procedures, rather than via the shutdown signals sent from the operating system kernel. Some of the applications that could benefit from this include such server applications as IBM WebSphere Application Server, Lotus Domino and various applications of SAP AG, which depend primarily on the UNIX System Services component of the IBM z/OS operating system to perform their required functions. Without this capability, these server applications would potentially be interrupted unexpectedly when UNIX System Services is shutdown. On existing UNIX platforms, by contrast, a shutdown will send out terminating signals to all processes, none of the processes on those systems is given an alternative mechanism to shutdown. The concept of allowing a UNIX process to temporarily block a UNIX shutdown does not exist in the prior art.

The present invention provides an advantage over the prior art because it allows certain server applications to shut down in a more controlled manner then what is available on existing UNIX platforms. On such existing UNIX platforms, all processes would be interrupted by terminating signals such as SIGTERM or SIGKILL which may interrupt the server in unexpected ways.

In a preferred embodiment, the shutdown of UNIX System Services is initiated by a console command (F OMVS, SHUTDOWN). Prior to actually shutting down UNIX System Services, all processes registered to block shutdown are notified of the impending shutdown. Shutdown then waits for the blocking processes to either unregister or end. If the blocking processes do not do so in a timely fashion, the shutdown request is aborted and the remaining blocking processes are identified via messages to the system console. If all blocking processes do end or unblock in a timely fashion, then the shutdown proceeds to take down all non-permanent processes and then clean up most UNIX System Services resources.

To be identified as a blocking process, a shutdown registration service is provided that allows certain privileged processes to register to block a shutdown. The blocker can request that either an exit or a SIGDANGER signal be driven to notify it of the impending shutdown. Once registered, the process is able to block shutdown until it either unregisters or ends.

DESCRIPTION OF THE PREFERRED EMBODIMENT

Figure 1:
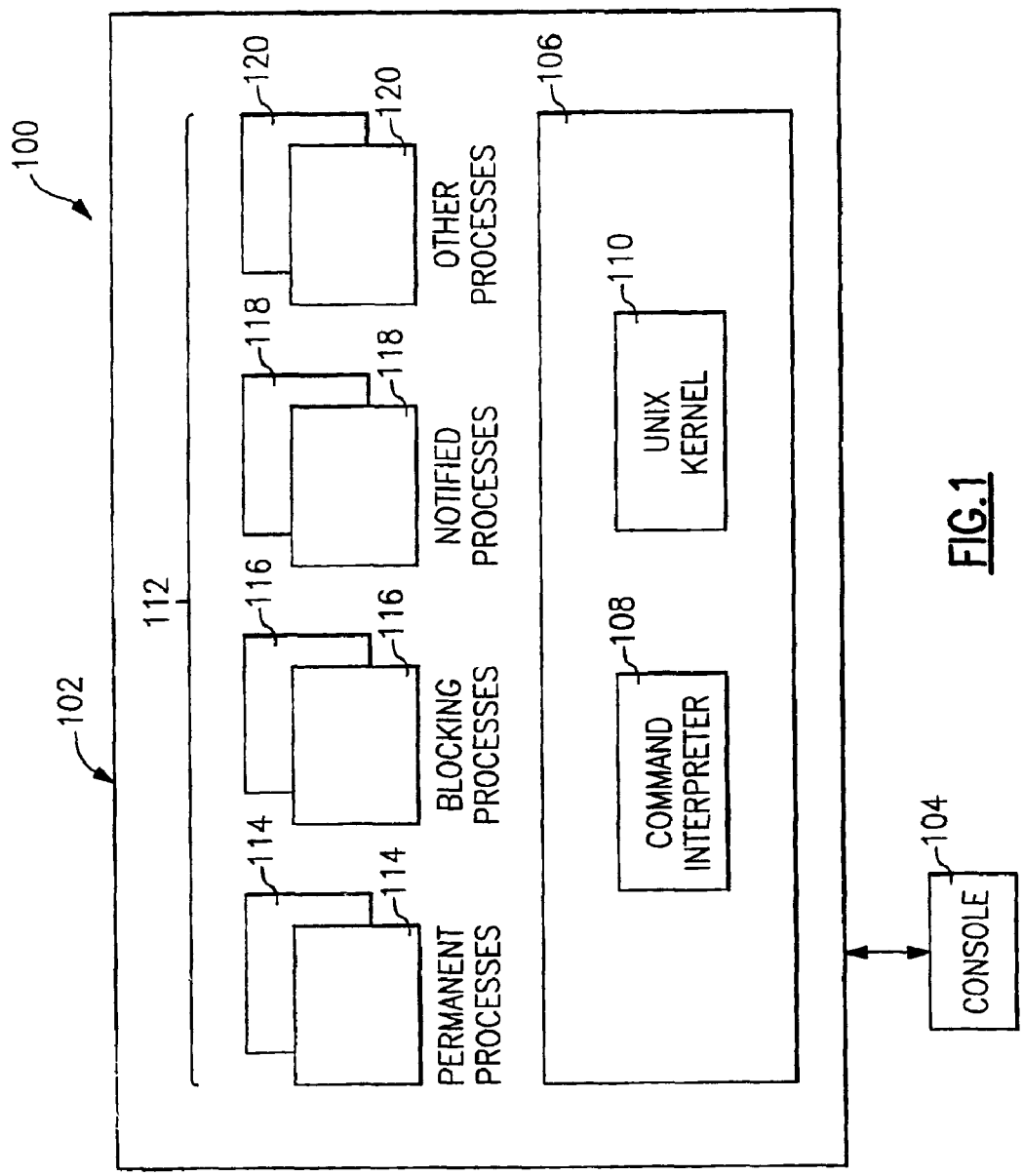
FIG. 1 shows an information handling system incorporating the present invention.

FIG. 1 is a schematic block diagram of an information handling system 100 incorporating the present invention. Information handling system 100 comprises a central processor complex (CPC) 102 to which an operator console 104 is attached. As is well known in the art, CPC 102 contains one or more central processors (CPs) as well as central storage for storing data currently being handled and programs currently being executed. Although not shown in FIG. 1, CPC 102 would typically be attached to various peripheral input/output (I/O) devices such as disk or tape drives, printers, communication networks and the like. Console 104 comprises an input device such as a keyboard for entering operator commands as well as an output device such as a monitor for displaying messages or responses to commands. Console 104 may comprise a personal computer (PC) that is attached to CPC 102 either directly or through a service processor not separately shown.

Although the disclosed embodiment uses a command-line interface in which commands are entered explicitly via a keyboard, other methods of entering commands—e.g., using a mouse and a graphical user interface (GUI)—could be used instead, and the term "command" is to be understood in this generalized sense. Similarly, while the disclosed embodiment displays text messages, graphical displays could be used as well, and the term "message" is to be understood in this generalized sense.

Executing on CPC 102 are one or more system images (one of which is shown), each of which comprises an operating system (OS) 106. Unless otherwise indicated, references to a "system" herein are to the system image corresponding to an OS 106. Although the invention is not limited to any particular platform, in the embodiment shown CPC 102 may comprise an IBM eServer zSeries server, while OS 106 may comprise the IBM z/OS operating system.

A command interpreter component 108 of OS 106 processes operator commands received from console 104 (including the shutdown command of the present invention) to effect appropriate changes in the system and generate a response message for the operator. A UNIX System Services (USS) component 110 ("UNIX kernel" in FIG. 1) of OS 106 performs UNIX functions for UNIX applications (not separately shown) executing on the system image.

Each system image contains not only an OS 106, but also one or more processes 112, including processes of the UNIX applications executing on the system image. For the purposes of the present invention, these processes 112 can be categorized as permanent processes 114, blocking processes 116, notified processes 118, and unnotified processes 120. Permanent processes 114 are processes 112 that may or may not be notified of an impending shutdown, but are not themselves terminated by a shutdown; typically these processes are non-UNIX processes. Blocking processes 116 are processes 112 that are notified of an impending shutdown and are terminated by such a shutdown if it goes to completion, but have the ability to block the shutdown if they do not unblock or terminate within a predetermined time period. Notified processes 118 are processes 112 that are notified of an impending shutdown and are terminated by such a shutdown, but do not have the ability to block the shutdown. Finally, unnotified processes 120 (the default classification) are processes that are not notified of an impending shutdown, but are terminated by such a shutdown. Collectively, blocking processes 116, notified processes 118 and unnotified processes 120 are referred to herein as eligible processes, since they are all potentially eligible for termination in a shutdown.

Preferably, only processes 112 having some specified authority are permitted to register as either permanent processes 114 or blocking processes 116, since an unauthorized process may adversely affect system operation if it is allowed to remain running as a permanent process 114 or block a shutdown as a blocking process 116.

Figure 2:
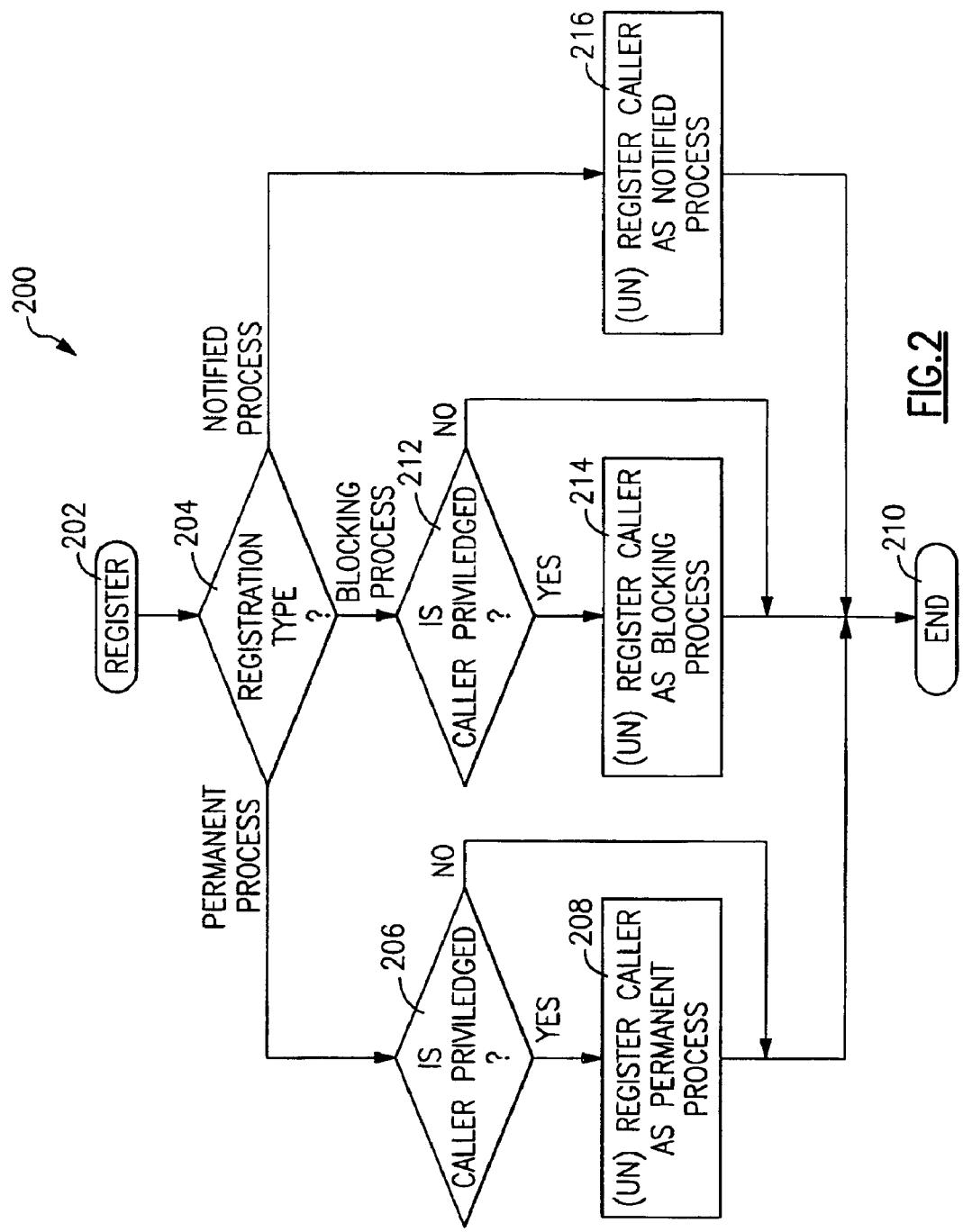
FIG. 2 shows the registration procedure of the present invention.

FIG. 2 shows the registration procedure 200 that is invoked by a process 112 seeking to register (or unregister) as a permanent process 114, a blocking process 116, or a notified process 118. Preferably, this procedure 200 is implemented as a callable service of the UNIX kernel 110, not separately shown in FIG. 1, which functions as a registration facility in this respect. When invoking this procedure, the caller presents various parameters specifying the type of registration requested (blocking process, permanent process, or notified process), the type of notification requested (e.g., a signal or a specified exit), and the like.

Upon being invoked (step 202), the procedure 200 first determines the type of registration requested (step 204). If the caller is seeking to register as a permanent process 114, the procedure 200 determines whether the caller is authorized to register as a permanent process (step 206). If the caller is authorized, the procedure 200 registers the caller as a permanent process 114 that is to receive the type of notification requested (step 208) and terminates (step 210). If, on the other hand, the caller is not authorized, the procedure 200 terminates (step 210) without registering the caller as a permanent process 114. Even though permanent processes 114 are not terminated by the shutdown procedure of the present invention, preferably they are nevertheless notified so that they can take appropriate action if desired.

In a similar manner, if at step 204 the caller is seeking to register as a blocking process 116, the procedure 200 determines whether the caller is authorized to register as a blocking process 116 (step 212). If the caller is authorized, the procedure 200 registers the caller as a blocking process 116 that is to receive the type of notification requested (step 214) and terminates (step 210). If, on the other hand, the caller is not authorized, the procedure 200 terminates (step 210) without registering the caller as a blocking process 116.

Finally, if at step 204 the caller is merely seeking to register as a notified process 118, the procedure 200 simply registers the caller as a notified process 118 that is to receive the type of notification requested (step 216), without performing an authorization check, and terminates (step 210).

Figure 3:
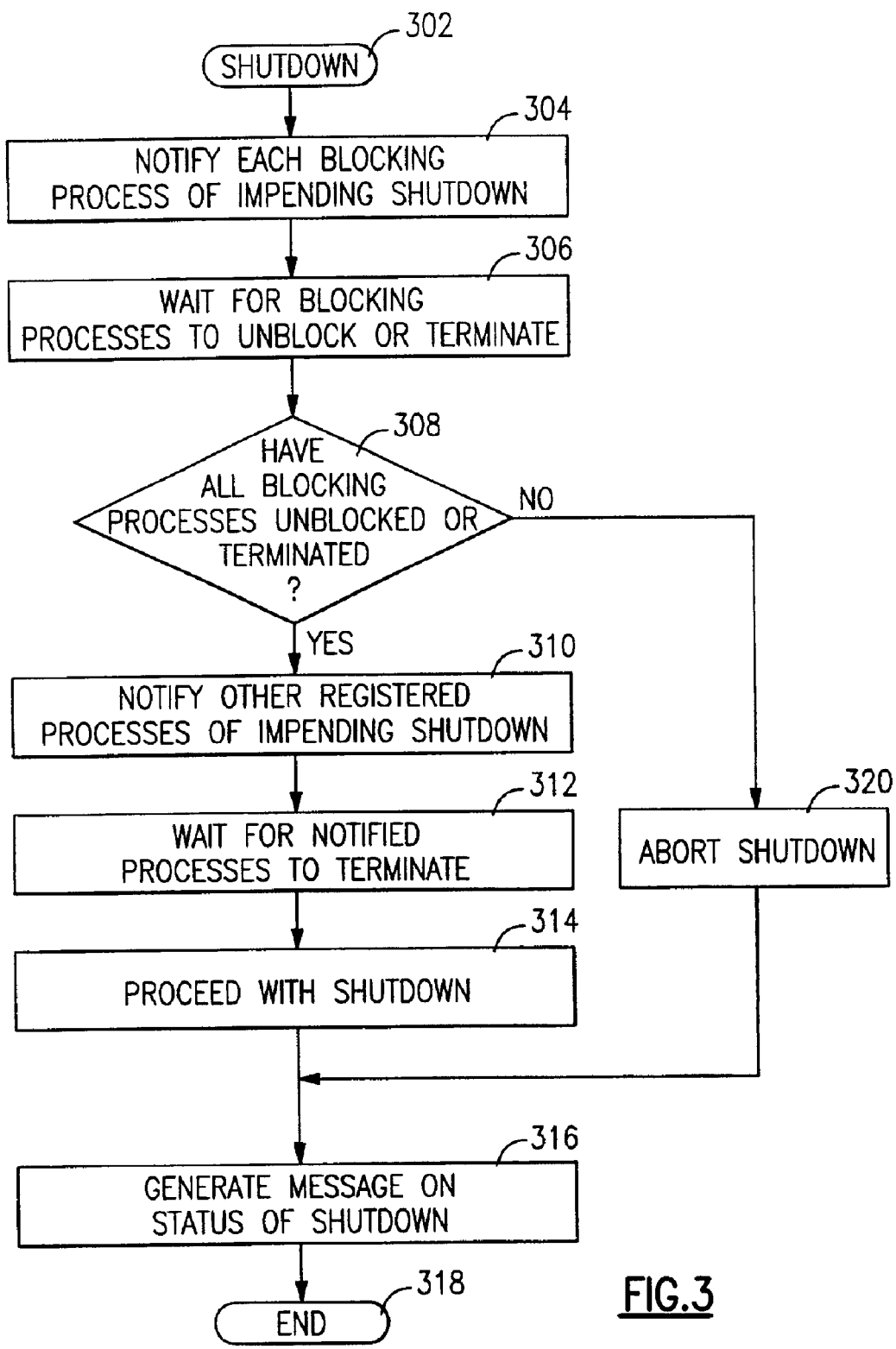
FIG. 3 shows the shutdown procedure of the present invention.

FIG. 3 shows the shutdown procedure 300 of the present invention. Preferably this procedure is initiated by the system operator from the operator console 104, either by entering an explicit shutdown command (e.g., "F OMVS, SHUTDOWN" in the embodiment shown) or by initiating shutdown through a graphical user interface (GUI). Procedure 300 is performed by command interpreter 114, which functions as a shutdown facility in this respect.

Upon being invoked (step 302), the shutdown procedure 300 first notifies each process 112 that is entitled to notification of an impending shutdown as a blocking process (step 304). In the embodiment shown, a process 112 is entitled to such notification of an impending shutdown if it has registered to receive notification of shutdown as a blocking process 116. The type of notification given to each process 112 that is registered as a blocking process 116 depends on the type of notification that was requested when the process originally registered; in the embodiment shown, this is either a SIGDANGER signal or a specified application exit.

Upon receiving notification of an impending shutdown, blocking processes 116 may take appropriate action to unblock or terminate. A blocking process 116 is able to abort an impending shutdown of all eligible processes 116, 118, 120 if it does not either terminate gracefully or unblock (i.e., unregister as a blocking process 116).

After waiting a predetermined time interval for the blocking processes 116 to take appropriate action (step 306), the shutdown procedure 300 determines whether all processes 112 that have registered as blocking processes 116 have either unblocked (by unregistering as blocking processes 116) or have terminated (step 308). If they have, then the procedure 300 sends notification to all other processes 112 registered for notification (step 310). This would include all processes 112 registered as notified processes 118, as well as all processes registered as permanent processes 114 that are to be notified. After waiting a predetermined time interval (step 312), the procedure 300 proceeds with the shutdown of all eligible processes, i.e., processes other than permanent processes 114 (step 314). Preferably, this is done by sending each eligible process a SIGTERM signal, followed by a SIGKILL signal if the process does not respond to the SIGTERM signal. Even though they are not terminated by the shutdown procedure 300, permanent processes 114 may be checkpointed at this time.

After the shutdown step, the procedure 300 generates an appropriate console message advising the console operator of the status of the shutdown, in this case completed (step 316), then terminates (step 318).

If at step 308 all processes 112 that have registered as blocking processes 116 have not either unblocked or have terminated, then the procedure 300 aborts the shutdown, without terminating any of the processes 112 (step 320), before generating a status message (step 316) and terminating (step 318). Preferably, the status message not only indicates that the shutdown has been aborted, but identifies the blocking processes 116 that resulted in the aborting of the shutdown.

While a particular embodiment has been shown and described, various modifications will be apparent to those skilled in the art.

What is claimed is:

1. A method for controlling the termination of one or more processes in an information handling system in response to a shutdown command, comprising the steps of:
   in response to a request from one of said processes to register as a blocking process, registering that process as a blocking process; and
   in response to receiving a shutdown command:
      notifying each of said blocking processes of an impending shutdown;
      determining whether all of said blocking processes have concurred in said shutdown; and
      terminating said processes if all of said blocking processes have concurred in said shutdown, otherwise, aborting said shutdown without terminating any of said processes.

2. The method of claim 1 in which said processes run under the control of an operating system kernel, said method being performed by said operating system kernel.

3. The method of claim 2 in which said processes are UNIX processes and said operating system kernel is a UNIX kernel.

4. The method of claim 1 in which said step of determining whether all of said blocking processes have concurred in said shutdown is performed upon the expiration of a predetermined time interval.

5. The method of claim 1, comprising the further step of:
   in response to a request from one of said processes to unregister as a blocking process, unregistering that process as a blocking process.

6. The method of claim 5 in which said determining step determines for each of said blocking processes whether the process has unregistered as a blocking process.

7. The method of claim 1 in which said determining step determines for each of said blocking processes whether the process has terminated.

8. The method of claim 1 in which said step of aborting said shutdown comprises the step of generating a message identifying processes that have not concurred in said shutdown.

9. The method of claim 1, comprising the further step of:
   in response to a request from one of said processes to register as a permanent process, registering that process as a permanent process ineligible for process termination.

10. The method of claim 9 in which said terminating step terminates processes that have not registered as permanent processes while allowing processes that have registered as permanent processes to continue to run.

11. Apparatus for controlling the termination of one or more processes in an information handling system in response to a shutdown command, comprising:
    a registration facility responsive to a request from one of said processes to register as a blocking process for registering that process as a blocking process; and
    a shutdown facility responsive to receiving a shutdown command for notifying each of said blocking processes of an impending shutdown and for terminating said processes only if all of said blocking processes have concurred in said shutdown.

12. The apparatus of claim 11 in which said processes run under the control of an operating system kernel, said apparatus being associated with said operating system kernel.

13. The apparatus of claim 12 in which said processes are UNIX processes and said operating system kernel is a UNIX kernel.

14. The apparatus of claim 11 in which said shutdown facility determines whether all of said blocking processes have concurred in said shutdown upon the expiration of a predetermined time interval.

15. The apparatus of claim 11 in which said registration facility is responsive to a request from one of said processes to unregister as a blocking process to unregister that process as a blocking process.

16. The apparatus of claim 15 in which said shutdown facility determines for each of said blocking processes whether the process has unregistered as a blocking process.

17. The apparatus of claim 11 in which said shutdown facility determines for each of said blocking processes whether the process has terminated.

18. The apparatus of claim 11 in which said shutdown facility generates a message identifying processes that have not concurred in said shutdown.

19. The apparatus of claim 11 in which said registration facility is responsive to a request from one of said processes to register as a permanent process to register that process as a permanent process ineligible for process termination.

20. The apparatus of claim 19 in which said shutdown facility terminates processes that have not registered as permanent processes while allowing processes that have registered as permanent processes to continue to run.

21. A program storage device readable by a machine, tangibly embodying a program of instructions executable by the machine to perform method steps for controlling the termination of one or more processes in response to a shutdown command in an information handling system in which such processes run under the control of an operating system kernel, said method steps comprising
   in response to a request from one of said processes to register as a blocking process, registering that process as a blocking process; and in response to receiving a shutdown command:
notifying each of said blocking processes of an impending shutdown;
determining whether all of said blocking processes have concurred in said shutdown; and
terminating said processes if all of said blocking processes have concurred in said shutdown, otherwise, aborting said shutdown without terminating any of said processes.

22. The program storage device of claim 21 in which said processes run under the control of an operating system kernel, said program of instructions being associated with said operating system kernel.

23. The program storage device of claim 22 in which said processes are UNIX processes and said operating system kernel is a UNIX kernel.

24. The program storage device of claim 21 in which said step of determining whether all of said blocking processes have concurred in said shutdown is performed upon the expiration of a predetermined time interval.

25. The program storage device of claim 21, said method steps further comprising:
in response to a request from one of said processes to unregister as a blocking process, unregistering that process as a blocking process.

26. The program storage device of claim 25 in which said step of determining whether all of said blocking processes have concurred in said shutdown determines for each of said blocking processes whether the process has unregistered as a blocking process.

27. The program storage device of claim 21 in which said step of determining whether all of said blocking processes have concurred in said shutdown determines for each of said blocking processes whether the process has terminated.

28. The program storage device of claim 21 in which said step of aborting said shutdown comprises the step of generating a message identifying processes that have not concurred in said shutdown.

29. The program storage device of claim 21, comprising the further step of:
in response to a request from one of said processes to register as a permanent process, registering that process as a permanent process ineligible for process termination.

30. The program storage device of claim 29 in which said terminating step terminates processes that have not registered as permanent processes while allowing processes that have registered as permanent processes to continue to run.

* * * * *